(12) United States Patent
Song et al.

(10) Patent No.: US 9,501,569 B2
(45) Date of Patent: Nov. 22, 2016

(54) AUTOMATIC TAXONOMY CONSTRUCTION FROM KEYWORDS

(71) Applicant: Microsoft Technology Licensing, LLC, Redmond, WA (US)

(72) Inventors: Yangqiu Song, Fanling (HK); Shixia Liu, Beijing (CN); Haixun Wang, Beijing (CN); Zhongyuan Wang, Beijing (CN); Hongsong Li, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 395 days.

(21) Appl. No.: 13/868,758

(22) Filed: Apr. 23, 2013

(65) Prior Publication Data

US 2014/0317074 A1   Oct. 23, 2014

(51) Int. Cl.
*G06F 17/30* (2006.01)

(52) U.S. Cl.
CPC ..... *G06F 17/30864* (2013.01); *G06F 17/3064* (2013.01)

(58) Field of Classification Search
CPC .................. G06F 17/30598; G06F 17/30864; G06F 17/3064
See application file for complete search history.

(56) References Cited

U.S. PATENT DOCUMENTS

| 6,363,378 B1* | 3/2002 | Conklin ............ G06F 17/30646 |
| 7,685,088 B2 | 3/2010 | Zhang et al. |
| 2005/0022115 A1 | 1/2005 | Baumgartner et al. |
| 2005/0114324 A1* | 5/2005 | Mayer ............................. 707/3 |

OTHER PUBLICATIONS

Adams, et al., "Tree-Structured Stick Breaking for Hierarchical Date", In Proceeding of Advances in Neural Information Processing Systems 23, 24th Annual Conference on Neural Information Processing Systems, Dec. 6, 2010, 9 pages.
Andronescu, et al., "Decision Tree Learning using a Bayesian Approach at each Node", Retrieved on: Nov. 20, 2012, Advances in Artificial Intelligence, 22nd Canadian Conf, May 2009, 308 pgs.
Banko et al., "Open Information Extraction from the Web", In Proceedings of the 20th International Joint Conference on Artificial Intelligence, Jan. 6, 2007, 7 pages.
Bentley, "Multidimensional Binary Search Trees Used for Associative Searching", In Magazine of Communications of the ACM, vol. 18, Issue 9, Sep. 1975, 9 pages.
Blundell, et al., "Bayesian Rose Trees", In Proceedings of the Twenty-Sixth Conference on Uncertainty in Artificial Intelligence, Jul. 8, 2010, 8 pages.
Bollacker, et al., "Freebase: A Collaboratively Created Graph Database for Structuring Human Knowledge", In Proceedings of the ACM SIGMOD International Conference on Management of Data, Jun. 9, 2008, 3 pages.

(Continued)

*Primary Examiner* — Huawen A Peng
(74) *Attorney, Agent, or Firm* — Sandy Swain; Micky Minhas; Lee & Hayes, PLLC (57) ABSTRACT

A system, method or computer readable storage device to derive a taxonomy from keywords is described herein. A domain-dependent taxonomy from a set of keywords may be automatically derived by leveraging both a general knowledgebase and keyword search. For example, concepts may be deduced with the technique of conceptualization, and context information may be extracted from a search engine. Then, the taxonomy may be constructed using a tree algorithm.

17 Claims, 6 Drawing Sheets

(56) References Cited

OTHER PUBLICATIONS

Carlson, et al., "Toward an Architecture for Never-Ending Language Learning", In Proceedings of the Twenty-Fourth AAAI Conference on Artificial Intelligence, Jul. 11, 2010, 8 pages.
Chen, et al., "Parallel Spectral Clustering in Distributed Systems", In Proceedings of IEEE Transactions on Pattern Analysis and Machine Intelligence, vol. 33, Issue 3, Mar. 2011, 19 pages.
Chuang, et al., "Towards Automatic Generation of Query Taxonomy: A Hierarchical Query Clustering Approach", In Proceedings of IEEE International Conference on Data Mining, Dec. 9, 2002, 8 pages.
Dasgupta, et al., "An Elementary Proof of the Johnson-Lindenstrauss Lemma", Technical Report TR-99-006, Mar. 1999, 6 pages.
Duijnhoven, "Knowledge Assessment using Bayesian Networks", Master's thesis Cognitive Artificial Intelligence, Jun. 3, 2003, 73 pages.
Etzioni, et al., "Web-Scale Information Extraction in Knowltall (Preliminary Results).", In Proceedings of the 13th International Conference on World Wide Web, May 17, 2004, 11 pages.
Soergel, Book Review of "WordNet: An Electronic Lexical Database", edited by Fellbaum, MIT Press 1998, retrieved Jan. 2013 from http://www.dsoergel.com/cv/C19.pdf, 7 pgs.
Fogarolli, "Cosema Content-based Semantic Annotator", In Proceedings of Fourth International Conference on Advances in Semantic Processing, Oct. 30, 2010, 6 pages.
Gionis, et al., "Similarity Search in High Dimensions via Hashing", In Proceedings of 25th International Conference on Very Large Data Bases, Sep. 7, 1999, 12 pages.
Hearst, "Automatic Acquisition of Hyponyms from Large Text Corpora", In Proceedings of the 14th Conference on Computational Linguistics, vol. 2, Aug. 23, 1992, 7 pages.
Jain, et al., "Data Clustering: A Review", In Journal of ACM Computing Surveys, vol. 31, Issue 3, Sep. 1999, 60 pages.
Knowles, et al., "Pitman-Yor Diffusion Trees", In Conference on Uncertainty in Artificial Intelligence, Jul. 17, 2011, 9 pages.
Leslie, et al., "Annotation of Paintings with High-level Semantic Concepts using Transductive Inference and Ontology-based Concept Disambiguation", In 15th International Conference on Multimedia, Sep. 23, 2007, 10 pages.
Lim, et al., "Faceted Search and Retrieval Based on Semantically Annotated Product Family Ontology", In Workshop on Exploiting Semantic Annotations in Information Retrieval, Feb. 9, 2009, 10 pages.
Liu, et al., "An Investigation of Practical Approximate Nearest Neighbor Algorithms", Neural Information Processing Systems, Dec. 13, 2004, 8 pages.
Liu et al, "Automatic Taxonomy Construction from Keywords", Proc of 18th ACM SIGKD Intl Conf on Knowledge Discovery and Data Mining, Aug. 2012, 9 pgs.
Liu et al, "Automatic Taxonomy Construction from Keywords", PowerPoint from of 18th ACM SIGKD Intl Conf on Knowledge Discovery and Data Mining, Aug. 2012, 23 pgs.
Madsen, et al., "Modeling Word Burstiness Using the Dirichlet Distribution", In 22nd International Conference on Machine Learning, Aug. 7, 2005, 8 pages.
Mani, et al., "Automatically Inducing Ontologies from Corpora", In 3rd International Workshop on Computational Terminology, Aug. 29, 2004, 8 pages.
Navigli, et al., "A Graph-Based Algorithm for Inducing Lexical Taxonomies from Scratch", In Proceedings of the Twenty-Second International Joint Conference on Artificial Intelligence, vol. 3, Jul. 16, 2011, 6 pages.
Ponzetto, et al., "Deriving a Large Scale Taxonomy from Wikipedia", In Proceedings of the 22nd National Conference on Artificial Intelligence, vol. 2, Jul. 22, 2007, 6 pages.
Poon, et al., "Unsupervised Ontology Induction from Text", In Proceedings of the 48th Annual Meeting of the Association for Computational Linguistics, Jul. 11, 2010, 10 pages.
Sadikov, et al., "Clustering Query Refinements by User Intent", In Proceedings of the 19th International Conference on World Wide Web, Apr. 26, 2010, 10 pages.
Shen, et al., "Mining Web Query Hierarchies from Clickthrough Data", In Proceedings of the 22nd National Conference on Artificial Intelligence, vol. 1, Jul. 22, 2007, 6 pages.
Song, et al., "Short Text Conceptualization using a Probabilistic Knowledgebase", In Proceedings of the 22nd International Joint Conference on Artificial Intelligence, vol. 3, Jul. 16, 2011, 7 pages.
Strehl et al., "Cluster Ensembles—A Knowledge Reuse Framework for Combining Multiple Partitions", Journal of Machine Learning Research 3, Dec. 2002, 35 pages.
Suchanek, et al., "Yago: A Core of Semantic Knowledge Unifying WordNet and Wikipedia", In Proceedings of the 16th International Conference on World Wide Web, May 8, 2007, 10 pages.
Uhlmann, "Satisfying General Proximity Similarity Queries with Metric Trees", Information Processing Letters, Nov 1991, vol. 40, No. 4, 5 pgs.
White, et al., "Predicting Short-Term Interests Using Activity-Based Search Context", In Proceedings of the 19th ACM International Conference on Information and Knowledge Management, Oct. 26, 2010, 10 pages.
Wu, et al., "Towards a Probabilistic Taxonomy of Many Concepts", Microsoft Research Technical Report MSR-TR-2011-25, Mar. 2011 and VLDB Aug. and Sep. 2011, 12 pages.
Xiao, et al., "Efficient Similarity Joins for Near Duplicate Detection", In Journal of ACM Transactions on Database Systems, vol. 36 Issue 3, Aug. 2011, 40 pages.
Lee et al, "Web Scale Taxonomy Cleansing", Proc VLDB Endowment, vol. 4, No. 12, Aug. and Sep. 2011, 12 pgs.
Wang et al. "Understanding Tables on the Web", Conceptual Modeling—31st Intl Conf ER, Oct. 2012, Proc Leture Notes in Computer Science, 14 pgs.
Wu et al, "Probase: A Probabilistic Taxonomy for Text Understanding", ACM Intl Conf on Management Data, SIGMOD, May 2012, 12 pgs.
Wang et al, "Towards Topic Search on the Web", Conceptual Modeling—31st Intl Conf ER, Oct. 2012, 10 pgs.

* cited by examiner

AUTOMATIC TAXONOMY CONSTRUCTION FROM KEYWORDS

BACKGROUND

Taxonomies, especially in specific domains, are becoming indispensable to a growing number of applications. For example, in web search, organizing domain-specific queries into a hierarchy provides a way to understand the queries, improve search results, and/or help with query refinement. In online advertising, taxonomies about specific domains (e.g., insurance, online ads) may be used to decide the relatedness between a given query and bidding keywords.

SUMMARY

Described herein are techniques for deriving a taxonomy from a set of keywords. In various embodiments, one or more devices may be configured to derive a taxonomy using keywords. The taxonomy may be created with the keywords and additional knowledge and contexts. To this end, a general purpose knowledgebase and keyword searches are utilized to supply the additional knowledge and context. Then, a Bayesian approach may be used to build a hierarchical taxonomy for a given set of keywords. The complexity of previous hierarchical clustering approaches may be reduced from $O(n^2 \log n)$ to $O(n \log n)$.

In various embodiments, these computing devices may also include one or more of a keywords module, context module, concepts module and taxonomy module.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Overview

Manual taxonomy construction is a laborious process, and the resulting taxonomy is often highly subjective compared with taxonomies built by data-driven approaches. Some data-driven approaches for domain-specific taxonomy induction may work by selecting a text corpus as its input assuming that the text corpus accurately represents the domain. For instance, to derive a medical or biological taxonomy, a commonly used text corpus is the entire body of biomedical literature from MEDLINE, life science journals, and online books (e.g., those on PubMed).

However, it may be easier to find a text corpus (e.g., the entire set of ACM publications) for big topics such as "computer science" but more difficult to find one for a specific topic such as "big data for business intelligence" because articles about such specific topics are likely to be dispersed in many different fields and forums. Furthermore, interest in new domains or fast changing domains may make it even more difficult to find a characterizing text corpus.

Instead of building taxonomies from a text corpus, a domain-specific taxonomy may be extracted from a general purpose knowledgebase such as the Open Directory Project (ODP) or Wikipedia®. However, a general purpose knowledgebase usually has low coverage on a highly focused domain, and it may also produce ambiguous interpretations for highly specialized terms in the domain.

This disclosure describes, in part, a method, system or computer-readable storage device to derive the taxonomy from a set of keywords instead of from a text corpus. The set of keywords provides the flexibility and ease to accurately characterize a domain, even if the domain is fast changing. Furthermore, in many cases, the set of keywords is often readily available. For instance, search engine companies are interested in creating taxonomies for specific advertising domains. Each domain is described by a set of related ad keywords (e.g., bid phrases).

As used herein, "keyword" refers to a word or phrase that has significance to a user. "A set of keywords" refers to a group of one or more words or phrases. Also, "knowledge" refers to concepts that correspond to each keyword.

In various embodiments, "knowledge+context" approach may be used for taxonomy construction. In order to create a taxonomy out of a set of keywords, concepts and context beyond the set of keywords may be utilized. For example, given the set of keywords: "vehicle insurance" and "car insurance," humans know that "car insurance" is a sub-concept of "vehicle insurance," because humans have the concept that a car is a vehicle. Without this concept, a machine may not be able to derive this relationship unless, for example, the extended corpus from the set of keywords (e.g., using keyword search) happens to describe this relationship in a syntactic pattern that the machine recognizes (e.g., "vehicles such as cars"). But the context also may be considered. It is unlikely that the knowledgebase, such as a general purpose knowledgebase, knows about every subsuming relationship in the specific domain. For example, x is a sub-concept of y may not be known. However, through the context, x may be highly related to z, and in the knowledgebase z is a sub-concept of y. Thus, using the "knowledge+context" approach, the relationship between x and y may be established.

In various embodiments, hierarchical clustering may be performed over features generated from the knowledgebase and the search engine. In some embodiments, one or more concepts for each word from the set of keywords may be deduced using the knowledgebase and then context information may be obtained from the search engine. After enriching the set of keywords using knowledge and context, a Bayesian-based hierarchical clustering may be used to automatically induce a new taxonomy. In some embodiments, the knowledge and context from each keyword may be derived. In other embodiments, the taxonomy building is formulated to a hierarchical clustering problem based at least in part on the knowledge and context.

Figure 1:
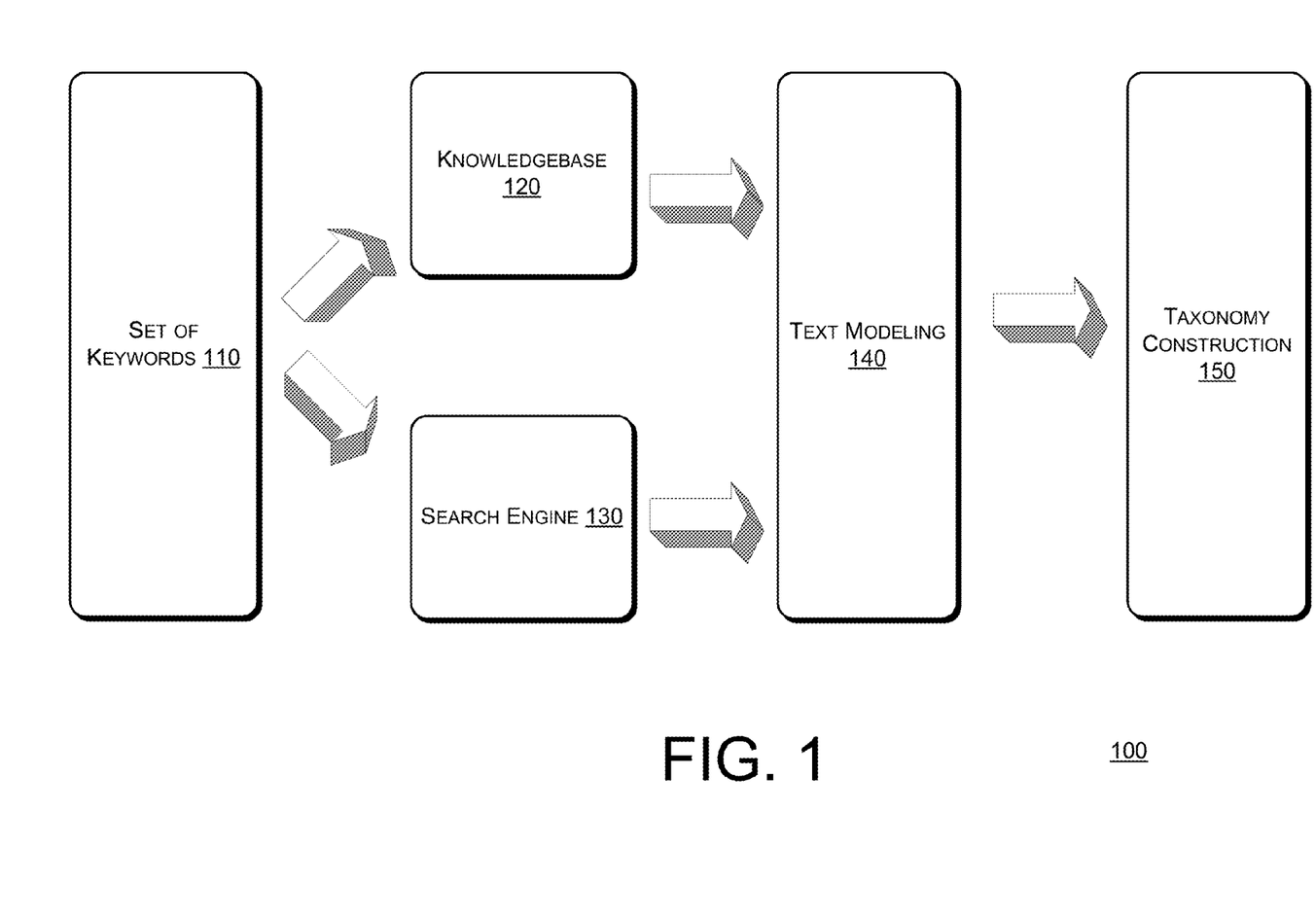
FIG. 1 illustrates an overview of an example scheme for automatic taxonomy construction with keywords, in accordance with various embodiments.

FIG. 1 shows an overview of an example scheme for automatic taxonomy construction from the set of keywords, in accordance with various embodiments. As illustrated in FIG. 1, the scheme 100 includes providing a set of keywords 110 being passed to both a knowledgebase 120 and search engine 130. The outputs of the knowledgebase 120 and search engine 130 are provided to text modeling 140 and then taxonomy construction 150.

In various embodiments, the set of keywords 110 is provided for building the taxonomy. In some embodiments, the taxonomy may be built for query suggestions. In other embodiments, the taxonomy may be used to provide personalized searches. In other embodiments, the taxonomy may be used with online advertising. For example, the set of keywords 110 may include one or more bid phrases. The set of keywords 110 may be words desired by a user for any purpose. The set of keywords 110 may include any number or types of words or phrases.

In various embodiments, the set of keywords 110 may be provided to a knowledgebase 120. The knowledgebase 120 derives concepts from the set of keywords 110. Any kind of knowledgebase may be used to determine the concepts for each keyword of the set of keywords 110. In some embodiments, a probability measure may be determined for how typical an instance of the given concept is with respect to one or more of these keywords. The probabilistic measurement may be used for text inference to determine how likely that the concept is intended for the keyword. Any known probabilistic measurement may be used to determine a strength of the concept with respect to one or more of the keywords.

In various embodiments, the set of keywords 110 may also be provided to a search engine 130. In some embodiment, a search engine 130 may include more than one search engine. The search engine 130 may be a commercial and/or proprietary search engine. Any kind of search engine may be used to perform searching on the set of keywords 110. The search engine 130 may receive one or more keywords from the set of keywords 110 and provide search results in response to the received one or more keywords. The search results may be analyzed such that snippets from the search results may be collected. In some embodiments, a predetermined number of snippets may be ranked and then collected from the search results. For example, the top ten snippets from the analyzed search result may be represented as a bag-of-words. The bag-of-words may be analyzed and used as context for the keywords.

In various embodiments, the context from the search engine 130 and concepts from the knowledgebase 120 are provided for text modeling 140. The text modeling 140 may provide analysis and computations to augment the set of keywords 110. In some embodiment, the text modeling 140 determines a weight for each term associated with a keyword of the set of keywords 110. Using a term/weight pair for each keyword, grouping may be performed to the keywords. In some embodiments, hierarchical clustering may be performed to group together these keywords based on the context and concepts of these keywords.

In various embodiments, taxonomy construction 150 uses hierarchical clustering algorithms to perform hierarchical clustering on the groupings. In some embodiments, binary trees may be constructed based on the relationships of the context and concepts of the keywords. In other embodiments, multi-branch clustering may be performed based on the relationships of the context and concepts of the keywords. Any clustering algorithms may be used to generate the taxonomy.

Example Electronic Device

Figure 2:
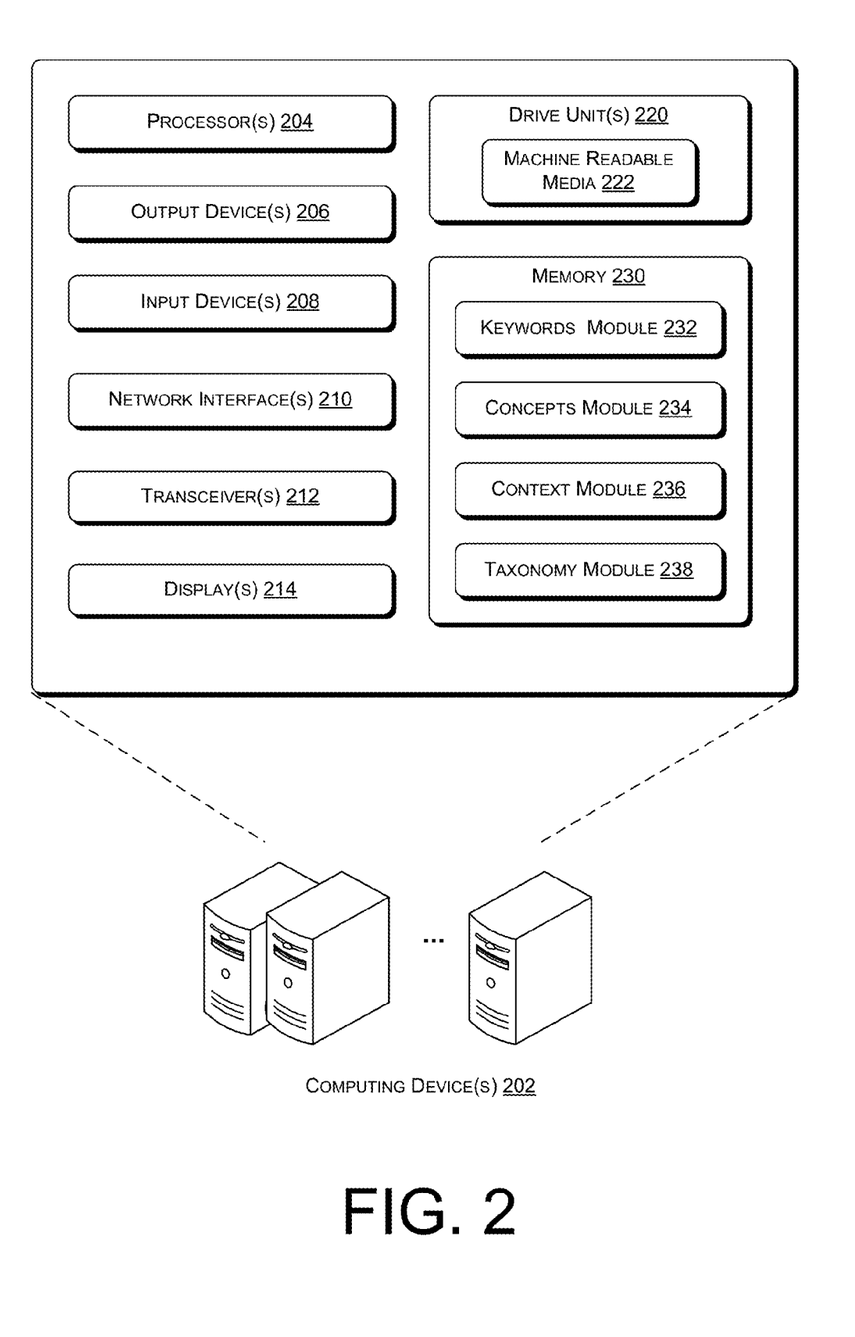
FIG. 2 illustrates example computing devices for automatic taxonomy construction with keywords, in accordance with various embodiments.

FIG. 2 illustrates an example computing device configured with functionality for performing various embodiments of congestion notification. As illustrated, one or more computing device(s) 202 (referred to as "computing device 202") may include processor(s) 204, output device(s) 206, input device(s) 208, network interface(s) 210, transceiver(s) 212, display(s) 214, drive unit(s) 220, and memory 230. The drive unit(s) 220 may include one or more machine readable media 222. The memory 230 may include a keywords module 232, a concept module 234, a context module 236 and a taxonomy module 238.

In various embodiments, the computing device(s) 202 may be any sort of computing device or computing devices. For example, the computing device(s) 202 may be or include a personal computer (PC), a laptop computer, a server or server farm, a mainframe, a tablet computer, a work station, a telecommunication device, a personal digital assistant (PDA), a media player, a media center device, a personal video recorder (PVR), a television, or any other sort of device or devices. In one implementation, the computing device(s) 202 represents a plurality of computing devices working in communication, such as a cloud computing network of nodes. When implemented on multiple computing devices (e.g., in a cloud computing system, etc.), the computing device(s) 202 may distribute the modules and data among the multiple devices. In some implementations, the computing device(s) 202 represents one or more virtual machines implemented on one or more computing devices.

In some implementations, a network may connect multiple devices represented by the computing device(s) 202, as mentioned above. Also, such network may connect the computing device(s) 202 to other devices. The network may be any type or combination of network, such as a data center network, a wide area network (WAN), a local area network (LAN), or the Internet. Also, the network may be public, private, or include both public and private networks. Further, the network may be wired, wireless, or include both wired and wireless networks. The network may utilize any one or more protocols for communication, such as the Internet Protocol (IP), other packet based protocols, carrier sense multiple access with collision avoidance (CSMA/CA), or any other protocols. Additionally, the network may include any number of intermediary devices, such as routers, switches, base stations, access points, firewalls, or gateway devices. Any of these devices or other devices with similar functions may be used as the intermediate nodes.

In various embodiments, processor(s) 204 may include any one or more processors, central processing units, graphic processing units, or any other sort of processing unit.

In some embodiments, the output device(s) 206 include any sort of output devices known in the art, such as a display (described below as display 214), speakers, a vibrating mechanism, or a tactile feedback mechanism. Output device(s) 206 also may include ports for one or more peripheral devices, such as headphones, peripheral speakers, or a peripheral display.

In various embodiments, input device(s) 208 include any sort of input devices known in the art. For example, input devices 208 may include a microphone, a camera, a keyboard/keypad, or a touch-sensitive display (such as the touch-sensitive display screen described above). A microphone may accept voice commands as input. A camera may capture an image or gesture as input. A keyboard/keypad may be a multi-key keyboard (such as a conventional QWERTY keyboard) or one or more other types of keys or buttons, and may also include a joystick-like controller and/or designated navigation buttons, or the like.

In various embodiments, the network interface(s) 210 may be any sort of interfaces. The network interface(s) 210 may support both wired and wireless connections to networks, such as cellular networks, radio, Wi-Fi networks, and short range networks (e.g., Bluetooth, IR, and so forth). Network interface(s) 210 may include any one or more of a WAN interface or a LAN interface.

In some embodiments, the transceiver(s) 212 include any sort of transceivers known in the art. The transceiver(s) 212 may include a radio interface. The transceiver(s) 212 may facilitate wired or wireless connectivity between the computing device(s) 202 and other devices.

In various embodiments, the display(s) 214 may include a display device and may be a LCD, plasma display panel (PDP), light-emitting diode (LED) display, or a cathode ray tube (CRT) display. Display(s) 214 may also be a touch-sensitive display screen, and can then also act as an input device or keypad, such as for providing a soft-key keyboard, navigation buttons, or the like.

The machine readable media 222 may be located in drive unit(s) 220 to store one or more sets of instructions (e.g., software) embodying any one or more of the methodologies or functions described herein. The instructions may also reside, completely or at least partially, within the memory 230 and within the processor(s) 204 during execution thereof by the computing device(s) 202. The memory 230 and the processor(s) 204 also may constitute the machine readable media 222.

Depending on the exact configuration and type of the computing device(s) 202, the memory 230 may be volatile (such as RAM), non-volatile (such as ROM, flash memory, miniature hard drive, memory card, or the like) or some combination thereof. The memory 230 may include an operating system, one or more program modules, and program data.

The computing device(s) 202 may have additional features and/or functionality. For example, the computing device(s) 202 may also include additional data storage devices (removable and/or non-removable) such as, for example, magnetic disks, optical disks, or tape. Such additional storage may include removable storage and/or non-removable storage.

As used herein, machine readable media 222 may include, at least, two types of Machine readable media, namely computer storage media and communication media.

Computer storage media may include volatile and non-volatile, removable, and non-removable media implemented in any method or technology for storage of information, such as computer readable instructions, data structures, program modules, or other data. The memory 230, the removable storage and the non-removable storage are all examples of computer storage media. Computer storage media includes, but is not limited to, random access memory (RAM), read only memory (ROM), electronically erasable programmable ROM (EEPROM), flash memory or other memory technology, compact disk ROM (CD-ROM), digital versatile disks (DVD), or other optical storage, magnetic cassettes, magnetic tape, magnetic disk storage or other magnetic storage devices, or any other medium that can be used to store information and which can be accessed by the computing device(s) 202. Any such computer storage media may be part of the computing device(s) 202. Moreover, the machine readable media 222 may include computer-executable instructions that, when executed by the processor(s) 204, perform various functions and/or operations described herein.

In contrast, communication media may embody computer-readable instructions, data structures, program modules, or other data in a modulated data signal, such as a carrier wave. As defined herein, computer storage media does not include communication media.

In various embodiments, memory 230 (and other memories described throughout) is an example of computer-readable storage device and may include the volatile and nonvolatile memory. Thus, the memory 230 may include, but is not limited to, RAM, ROM, EEPROM, flash memory, or other memory technology, miniature hard drive, memory card, optical storage (e.g., CD-ROM, DVD), magnetic cassettes, magnetic tape, magnetic disk storage (e.g., floppy disk, hard drives, etc.) or other magnetic storage devices, or any other medium which can be used to store information, media items or applications and data for access by the computing device(s) 202.

Memory 230 may also be described as computer readable storage media and may include removable and non-removable media implemented in any method or technology for storage of information, such as computer readable instructions, data structures, program modules, or other data.

The memory 230 may be used to store any number of functional components that are executable on the processor(s) 204, as well as data and content items that are rendered by the computing device 202. Thus, the memory 230 may, for example, store an operating system. In various embodiments, the keywords module 232, concepts module 234, context module 236 and taxonomy module 238 may be stored in the memory 230.

In various embodiments, these modules may be configured to assist in the building of a domain specific taxonomy from the set of keywords 110 augmented with concepts and context. In some embodiments, concepts and context related to one or more keywords of the set of keywords 110 may be determined. The concepts may be determined using a technique called short text conceptualization with a general purpose knowledgebase called Probase. The context may be obtained by submitting the set of keywords 110 as queries to the search engine 130 to retrieve all snippet words. In some embodiments, the taxonomy may then be constructed using a hierarchical clustering approach on the concepts and context associated with the set of keywords 110.

In some embodiments, the keyword module 232 is configured to receive, store and/or provide the set of keywords 110. In some embodiments, the keyword module 232 may parse the set of keywords 110 to generate individualized keywords. In other embodiments, the set of keywords 110 may be received and provided to the search engine 130 and knowledgebase 120 without chunking, parsing or any other modifications.

In various embodiments, concepts module 234 may be configured to derive concepts from the knowledgebase. The concept module 234 receives the set of keywords 110. Then, it may format the set of keywords to be understandable by the knowledgebase 120. The knowledgebase 120 performs the processing and returns the concepts associated with the set of keywords. In some embodiments, the knowledgebase 120 may be Probase. The core of Probase includes a large set of isa relationships, which are extracted from a text corpus of 1.68 billion web pages. For example, " . . . Spanish artists such as Pablo Picasso . . . " is considered a piece of evidence for the claim that "Pablo Picasso" is an instance of the concept Spanish artist. Probase also contains other information. For example, for each concept, it contains a set of attributes that describes the concept. A feature of Probase is the broadness of its coverage. Probase contains millions of concepts, from well-known ones such as "country" and "artists" to small but concrete ones such as "wedding dress designers" and "renewable energy techniques."

The knowledgebase such as Probase derives concepts from keywords. The concepts may be used to enrich the keywords. For instance, "microsoft and apple" may be provided to derive concepts such as IT companies, big companies, etc., and "apple and pear" may be provided to derive concepts such as fruit or tree. However, these derived concepts may not be enough for understanding the keywords.

In order to model text for inferencing, the concepts may be made probabilistic by utilizing a set of probabilistic measures. For example, P(instance|concept) represents how typical the instance in the given concept is. For instance, knowing that both "robin" and "penguin" are birds may not be enough. The probabilistic measures may provide additional information such as "robin" is a much more typical bird than "penguin." In other words, when people mention birds, it is more likely that they are referring to a robin than a penguin. Such information may be used for understanding the intent behind a piece of short text. In addition, P(concept|instance), P(concept|attribute), and P(attribute|concept) may also be calculated during the information extraction process. P(instance|concept) may be defined as:

$$P(\text{instance} \mid \text{concept}) = \frac{n(\text{instance, concept})}{n(\text{concept})},$$

where n(instance, concept) denotes the number of times that the instance and concept co-occur in the same sentence in a given corpus, and n(concept) is the frequency of the concept.

A keyword in the set of keywords 110 may be syntactically and semantically complicated and require sophisticated chunking and parsing to identify meaningful terms. In some embodiments, a set of keywords such as "Indiana cheap car insurance" may be conceptualize by first recognizing the terms "Indiana," "cheap car," and "car insurance" that appear in a knowledgebase, and then from these terms, concepts such as state, car insurance, bill, etc. may be derive. In some embodiments, each concept is associated with a probability score that indicates the strength of the concept.

In various embodiments, the context module 236 is configured to obtain context of keywords. The context module may collect the "context" of a keyword, and use the context to supplement the concepts related to the keyword. To obtain the context, the keyword may be submitted to a search engine, and the top ten snippets in the search results may be collect. The snippets may be stored as the bag-of-words. The context may be associated with the snippets by representing with the bag-of-words. As an example, consider two keywords, "www.monster.com" and "monster.com." A knowledgebase knows that "monster.com" is a job site, but it knows nothing about "www.monster.com." Thus, conceptualization may report that the two keywords have zero similarity. Through the search engine, an association may be obtained for "www. monster.com" with results such as web site, online job site, job board, etc. Thus, by adding the context information, the query containing "www.monster.com" may be determined to have greater similarity to the query containing "monster.com."

In various embodiments, the taxonomy module 238 may be configured to perform text modeling and taxonomy construction. Text modeling may be performed to include weights into a hierarchy. In some embodiments, features including concepts and contexts may be used to represent the data for taxonomy construction. Since even a short piece of text may contain multiple topics or concepts, they may be ranked by their significance. Thus, weights are incorporated into a marginal distribution.

In some embodiments, given a set of keywords {keyword$_1$, . . . , keyword$_n$}, a list of (term, weight) pairs for each keyword may be derived, where the term is either a concept produced by the knowledgebase, or a context generated by the search engine, and the weight is derived as follows: weight$_j$=λ·freq(term$_j$)+(1−λ)·Σ$_i$$''$C$_i$·P(term$_j$|keyword$_i$) where λ is a parameter that controls how much more valuable the context may be as compared to concepts; freq(term$_j$) is the frequency of a term j in the context derived from search results; P(term$_j$|keyword$_i$) is the probability of the term as a concept given a keyword such as keyword, and is provided by the knowledgebase; C$_i$ is the frequency of keyword$_i$ in the knowledgebase, and C$_i$·P(term$_j$|keyword$_i$) is used as the frequency of the term as a concept. The feature vector x$_i$ may then be set with the term frequencies weight$_j$'s for keyword$_i$.

In the hierarchical clustering algorithm, multiple branch hierarchical clustering approach may be used. In some embodiments, once two keywords are grouped together, the grouped keywords may contain multiple topics. For example, four keywords: "China," "India," "Germany," and "France" share some common concepts such as country and nation. They may still be distinguished based on the concepts with different tiers or levels of weights. First, "China" and "India" may be grouped together since they share many concepts like Asian country and emerging market. "Germany" and "France" may also be grouped together because they share concepts like European country and Western nation. After that, these two clusters may be grouped together. The final cluster actually contains multiple topics, i.e. both Asian country and European country.

In various embodiments, Dirichlet compound multinomial (DCM) distribution may be used to represent the marginal distribution f (D). DCM is derived based on multinomial and Dirichlet distributions. Multinomial distribution naturally may characterize the co-occurrence counts of terms, while the Dirichlet distribution may be regarded as smoothing over the counts. The generative process of a document underlying this modeling is performed by first sampling a multinomial distribution from Dirichlet distribution. Then, a document may be sampled based at least in part on the multinomial distribution. Multinomial distribution may be regarded as a document-specific sub-topic distribution, which makes certain words appear more likely in a particular document. DCM integrates out the intermediate multinomial distribution. Thus, the result represents either more general topics or multiple topics. In hierarchical clustering, clusters are incrementally merged. Therefore, DCM evaluates whether to merge two clusters (with multiple topics).

Specifically, the likelihood of multinomial distribution p(x|θ) is defined by:

$$p(x \mid \theta) = \frac{m!}{\prod\limits_{j}^{V} x^{(j)}!} \prod_{j=1}^{V} p(x^{(j)} \mid \theta)$$

$$= \frac{m!}{\prod\limits_{j}^{V} x^{(j)}!} \prod_{j=1}^{V} [\theta^{(j)}]^{x^{(j)}},$$

where V is the vocabulary size, $x^{(j)}$ is the frequency of term $v^{(j)}$, $m=\Sigma_j^V x^{(j)}$, and $\theta=(\theta^{(1)}, \theta^{(2)}, \ldots, \theta^{(V)})^T \in \mathcal{R}^V$ are the parameters of multinomial distribution.

The Dirichlet distribution prior is:

$$p(\theta \mid \alpha) = \frac{\Gamma\left(\sum_{j=1}^{V} \alpha^{(j)}\right)}{\prod_{j=1}^{V} \Gamma(\alpha^{(j)})} \prod_{j=1}^{V} [\theta^{(j)}]^{\alpha^{(j)}-1}$$

$$= \frac{1}{\Delta(\alpha)} \prod_{j=1}^{V} [\theta^{(j)}]^{\alpha^{(j)}-1},$$

where $\alpha=(\alpha^{(1)}, \alpha^{(2)}, \ldots, \alpha^{(V)})^T \in \mathcal{R}^V$, and the Gamma function has the property $\Gamma(x+1)=x\Gamma(x)$. The "Dirichlet delta function"

$$\Delta(\alpha) = \frac{\prod_{j=1}^{V} \Gamma(\alpha^{(j)})}{\Gamma\left(\sum_{j=1}^{V} \alpha^{(j)}\right)}$$

is introduced for convenience.

Then the marginal distribution f(D) is given by:

$$f_{DCM}(\mathcal{D}) = \int_\theta \prod_i^n p(x_i \mid \theta) p(\theta \mid \alpha) d\theta$$

$$= \prod_i^n \frac{m!}{\prod_j^V x_i^{(j)}!} \cdot \frac{\Delta\left(\alpha + \sum_i x_i\right)}{\Delta(\alpha)}.$$

Using this marginal distribution $f_{DCM}(D)$, the weights may be integrated into a feature vector $x_i$. For example, a Nearest-neighbor-based BRT may be used to construct the tree more efficiently using the following algorithm:

---

Input: A set of documents $\mathcal{D}$.
Initialization 1: Set $T_i = x_i$ for i = 1,2, ... , n; number of clusters c = n.
Initialization 2: Find the nearest neighbors $\mathcal{N}(T_i)$ for each cluster, and compute all the likelihood scores.
While c > 1 do
   1. Find $T_i$ and $T_j$ in all neighborhood sets $\{\mathcal{N}_k(T_i)\}$,
   whose merge maximizes $\frac{p(\mathcal{D}_m \mid T_m)}{p(\mathcal{D}_i \mid T_i) p(\mathcal{D}_j \mid T_j)}$, where m ∈
   { join, absorb, collapse }.
   2. $T_m \leftarrow$ the result of merge on $T_i$ and $T_j$.
   3. Delete $T_i$ and $T_j$.
   4. Find the nearest neighbors set $\mathcal{N}(T_m)$ for the new cluster.
   5. c ← c − 1.
end while.

---

In various embodiments, an efficient taxonomy construction may be performed, the most time consuming process in agglomerative clustering lies in searching all candidate cluster pairs to find the pairs to merge. In some embodiments, the search space for BRT may be reduced by pruning the pairs of keyword clusters that are most unlikely to be merged. Thus, the cost of searching agglomerative clustering may be reduced. In some embodiments, a set of nearest neighbors may be "cached" for each data point. Then, the search complexity only depends on the number of the nearest neighbors. However, searching for nearest neighbors still incurs a cost of O(n) for each data point. The time complexity of finding k nearest neighbors may be reduced to O(log n) using techniques such as KD-trees and metric trees. However, these techniques are not suitable for high-dimensional data, since they partition the data space dimension by dimension. Approximation methods such as LSH (Locality-Sensitive Hashing) may be used when the number of dimensions is large. Particularly, spilltree relaxes the non-overlapping constraints of metric trees and incorporates the technique used in LSH, and combines the benefits of both methods.

In some embodiments, two major types of nearest neighbor approaches for efficient taxonomy construction: k-nearest-neighbor (kNN) and ϵ-ball-nearest-neighbor (ϵNN) may be used. kNN finds k nearest neighbors for each data and is not concerned the density of the data. ϵNN uses a spherical ball to bind all the nearest neighbors within the ball. In some taxonomy construction approach, the time complexity may be reduced by using methods such as spilltree and PPJoin+.

kNN-BRT:

For the kNN approach, the k nearest neighbors for each data point may be determined, and then the possibility of merging within the neighborhood set may be checked. $N_k(x)$ is denoted as the k nearest neighbor set of data x. To find k nearest neighbors of a data, a minheap with size k may be kept to maintain the data with largest similarities scores. When new data comes and the similarity score is larger than the top value (the smallest one in the minheap), the top index may be replaced with the new data. Compared to BRT, the space cost is significantly reduced from $O(n^2)$ to $O(nk)$. The time complexity is also reduced to $O(n^2 \cdot C_V + n^2 \log k)$.

Spilltree-BRT:

Using the k nearest neighbors to construct BRT is still time consuming. The spilltree algorithm may be used to further reduce the time complexity.

Spilltree is a generalization of metric trees. Metric trees partition the data space into binary trees, and retrieve the nearest neighbors by DFS (depth first search). Metric trees may be less efficient when the number of dimensionality is large (e.g., larger than 30). The spilltree algorithm may introduce random projection before partitioning the data space and introduce the overlapping/non-overlapping regions between nodes when partitioning each sub-tree. While searching for the nearest neighbors in the sub-trees with overlapping partitions, spilltree searches only one branch.

According to the Johnson-Lindenstrauss Lemma, embedding a data set of dimension n to an O(log n) dimensional space has little distortions for pairwise distances. As a result, brute-force search in the projected space provides a (1+ϵ)-NN in the original space. Thus, by projecting the data onto a lower dimensional space, high precision may be guaranteed while the time cost is reduced, especially when the original data has millions of dimensions. Moreover, original metric trees perform a DFS to find the nearest neighbors. By introducing the overlapping nodes, spilltree adopts a combined strategy of a defeatist search and DFS. The defeatist search may fail for non-overlapping nodes if a query and its nearest neighbors belong to different branches. However, it is guaranteed to be successful for the overlapping nodes when the shortest distance in the overlapping regions is larger than or equal to the distance between the query and its nearest neighbor. By setting an appropriate tolerance parameter τ, the accuracies of both overlapping and non-overlapping nodes may be ensured. Overall, the time complexity of search for Spilltree is O(log n).

The random projection to d-dimensional space has the time complexity of O(nd·$C_V$). Building a spilltree costs O(nd log n). To use spilltree to search the k nearest neighbors, a minheap to maintain k data points may also be used when traversing the spilltree. This step will cost O(nd log n log k) time for all the data. In summary, using spilltree to build BRT costs O(nd·$C_V$+nd log n log k). Compared to the kNN-BRT algorithm, using the spilltree will cost additional O(Vd+nd) memory to store the random projection matrix and the spilltree.

In εNN-approximation, for each data point, its nearest neighbors whose similarity with the data point larger than a pre-defined threshold ε is kept. This reduces the time complexity to O($n^2$·$C_V$). The storage of εNN depends on the number of the neighbors that satisfy the E threshold. In some embodiment, the εNN algorithm may be repeated in order to ensure candidates to be merged are found, since when the threshold ε is too large, εNN will not return any nearest neighbors.

PPJoin-BRT:

To support εNN-approximation, the PPJoin+ approach is used to find ε neighbors of a data point efficiently. PPJoin+ may use two types of filtering, prefix filtering and suffix filtering, to filter out the data points that do not satisfy certain constraints. In prefix filtering, it has been proven that the cosine similarity is larger than a threshold ε if and only if the number of overlapped terms between the two sets is larger than $\epsilon' = \lceil \epsilon\sqrt{L_i L_j} \rceil$, where $L_i = \Sigma_k x_i^{(k)}$ is the length of the document $x_i$. Therefore, pairs of documents may be filtered out as if their overlap is larger than ε'. The time complexity of this step is reduced to $(1-\epsilon^2)\Sigma_j x^{(j)}$, ε<1. In suffix filtering, it first derives an upper bound of hamming distance $H_{max}$ corresponding to the pre-defined threshold E. Then, the data may be filtered out if the lower bound of the hamming distance between two documents $H_{min}(x_i, x_j)$ is larger than the upper bound $H_{max}$. An algorithm may be implemented based on the binary search for the lower bound of the hamming distance. The overall time complexity of PPJoin+ is O($n^2$[(1−$\epsilon^2$)L+log L]), where L is the average length of documents. PPJoin-BRT takes O(nf(ε)) memory to store the likelihood values of the nearest neighbors. Moreover, it may use an inverted index to facilitate prefix filtering, and the memory cost is O(nL).

Thus, spilltree-BRT has the least time complexity; however, it requires more memory.

The table below illustrates comparison of computational complexity and memory cost of different algorithms. ($C_V$ is the number of non-zero elements in the vector x and $L=\Sigma_j x^{(j)}$)

| Algorithm | Time complexity | Memory cost |
| --- | --- | --- |
| BRT | O ($n^2$ · $C_V$ + $n^2$logn) | O ($n^2$) |
| kNN-BRT | O ($n^2$ · $C_V$ + $n^2$logk) | O (nk) |
| Spilltree-BRT | O (nd · $C_V$ + ndlognlogk) | O (nk + Vd + nd) |
| PPJoin-BRT | O ($n^2$ [(1 − $\epsilon^2$) L + logL]) | O (nf (ε) + nL) |

Example Processes

Figure 3:
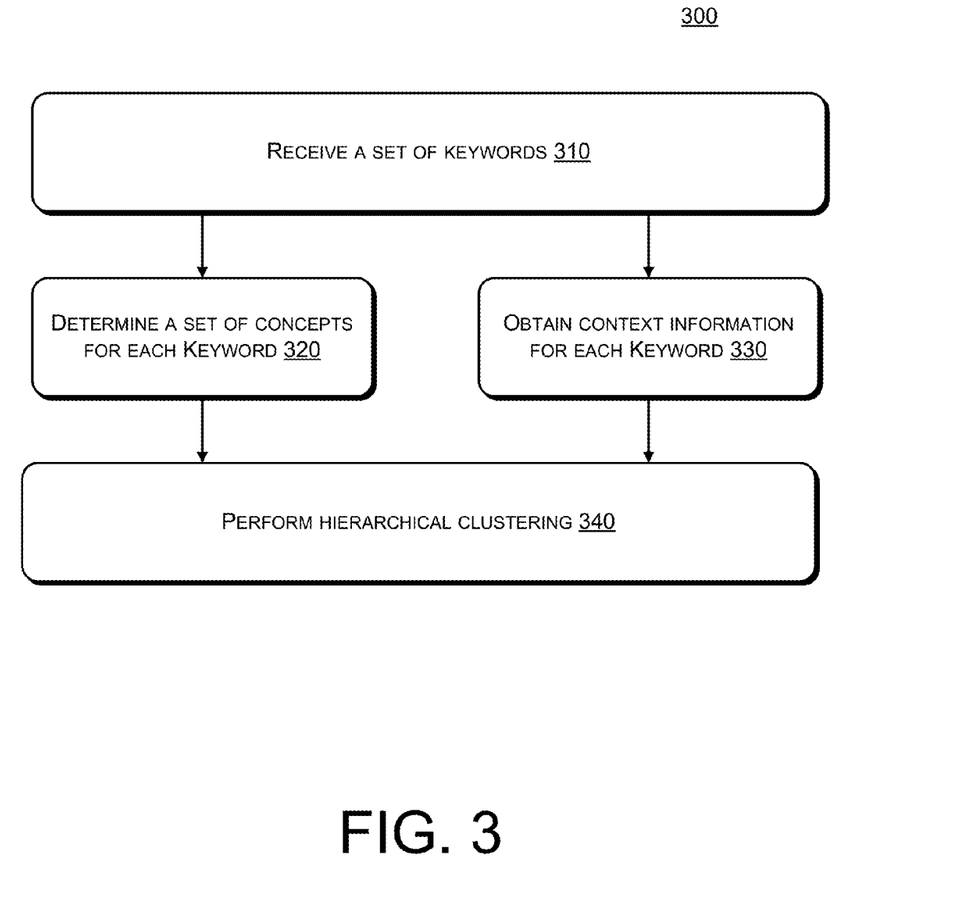
FIG. 3 illustrates an example process for automatic taxonomy construction, in accordance with various embodiments.

FIG. 3 is a flow diagram of an illustrative process 300 for automatic taxonomy construction. The process 300 is illustrated as a collection of blocks in a logical flow graph, which represents a sequence of operations that may be implemented in hardware, processor-executable instructions (software or firmware), or a combination thereof. In the context of software, the blocks represent computer-executable instructions that, when executed by one or more processor(s) 204, cause the one or more processors to perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Further, these operations may, but need not necessarily, be implemented using the arrangement of FIGS. 1-2. Consequently, by way of explanation, and not limitation, the method is described in the context of FIGS. 1-2. Other processes described throughout this disclosure, including the processes 400, 500 and 600, in addition to process 300, shall be interpreted accordingly.

In various embodiments, the process 300 performs operations for automatic taxonomy construction.

At 310, a set of keywords 110 may be received as input. In some embodiments, the set of keywords 110 may be received as search queries. In some embodiments the set of keywords 110 may be words or phrases entered by a user using one or more of the input devices. In some embodiments, the set of keywords 110 may be mined from a database. Any other source or combination of any sources may be used to obtain the set of keywords 110.

At 320, a set of concepts may be determined for each keyword from the set of keywords 110. The set of concepts may be determined using a knowledgebase 120. In some embodiments, the knowledgebase 120 may be a general purpose knowledgebase. Some examples of the general purpose knowledgebase include the ODP, Wikipedia® and Probase. The set of keywords 110 may be parsed into a format acceptable by the knowledgebase 120. The set of keywords 110 may be parsed into a subset of keywords and formatted according to the input settings of the knowledgebase 120. In some embodiments, the process of formatting of the keywords may be skipped based on the type of knowledgebase. The set of keywords may be provided directly to the knowledgebase 120. The knowledgebase 120 may determine one or more terms in response to the provided keywords. In some embodiments, terms with ambiguous meaning or multiple topics may be abstracted to a set of meaningful concepts with probabilities.

At 330, context information may be obtained from the set of keywords. The context information may be obtained by performing a search using the set of keywords 110. In some embodiments, the search may be performed using the search engine 130. For example, the search engine 130 may be a commercial search engine accessible via the Internet. The search engine 130 may be a proprietary search engine accessed via an intranet. Any search engine may be utilized as desired by a user. The search results from the search engine 130 may be analyzed to obtain the context information.

At 340, hierarchical clustering may be performed to each of the keywords. In various embodiments, one or more of the keywords may be clustered based on the context and concepts as obtained and/or derived above. In some embodiments, weights may be associated with different concepts and/or context and assist in hierarchical clustering. In some embodiments, a weight may be determined based at least in part on a frequency of a term with respect to a keyword. In some embodiments, a weight may be based at least in part on a parameter that is associated with an importance of the context compare to the concepts. Any weighting strategy and tree building algorithms may be used to generate the topology.

Figure 4:
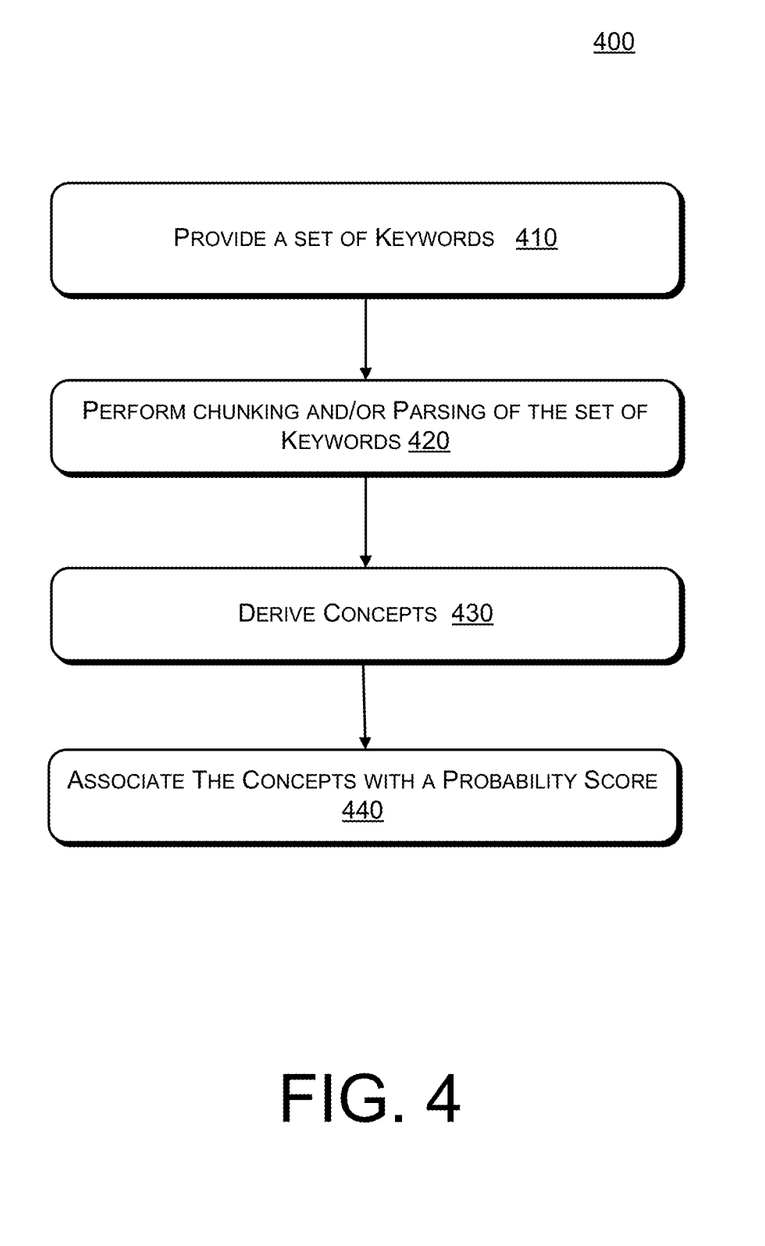
FIG. 4 illustrates an example process for determining concepts, in accordance with various embodiments.

FIG. 4 illustrates an example process for determining concepts, in accordance with various embodiments.

At 410, keywords may be provided to be processed. In some embodiments, the keywords may be obtained from the set of keywords 110. The keywords may be received by a concepts module 234.

At 420, chunking and/or parsing may be performed on the set of keywords to establish one or more keywords to be inputted to the knowledgebase 120. Any methods may be used to segment the set of keywords so that concepts associated with the set of keywords may be found within the knowledgebase 120 and returned by the knowledgebase 120. The keywords provided to the knowledgebase 120 may depend on the interface and/or configuration of the knowledgebase 120. The keywords may be segmented or formatted according to the interface and/or configuration.

At 430, concepts may be derived using the terms from the knowledgebase 120. The knowledgebase 120 may return terms associated with the keywords provided to the knowledgebase 120. In some embodiments, terms are identified as concepts for the set of keywords 110. Any compatible process to derive the concept may be used based on the type of knowledgebase available.

At 440, the concepts are associated with a probability score. In some embodiments, it may be desirable to make the concepts in the knowledgebase 120 probabilistic with respect to the associated terms. For example, the probability measure or probability score may indicate how typical the use of a term may be for a given concept.

Figure 5:
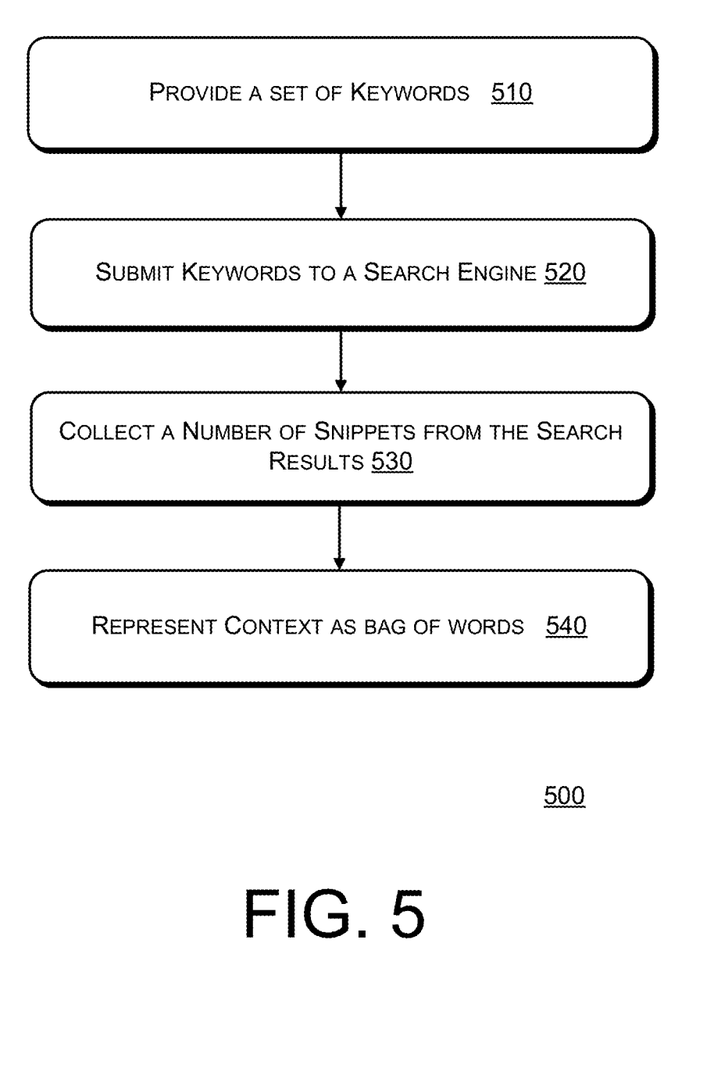
FIG. 5 illustrates an example process for obtaining context, in accordance with various embodiments.

FIG. 5 illustrates an example process for obtaining context, in accordance with various embodiments. At 510, keywords may be received by the context module 236.

At 520, keywords are submitted to a search engine 130. In some embodiments, each keyword is submitted individually. In some embodiments, a query associated with the set of keywords may be submitted. In some embodiments, a combination of one or more of the keywords may be submitted. Any desired input may be provided to the search engine 130 in a format acceptable by the search engine 130. The search results that are produced by the search engine 130 may be analyzed to determine the context associated with the searched keywords.

At 530, context may be determined by collecting snippets from the search result. In some embodiments, a snippet includes repeated search result information, such as repeated words or phrases that appeared in the search results. The snippets may be collected and grouped. In some embodiments, the snippets may be ranked by frequency of occurrence. In some embodiments, a number, such as top ten, ranked snippets may be collected because the increase frequency of occurrence may correctly provide the context of the searched keyword(s). Any one or more of the snippets may be collected as desired.

At 540, context for a keyword may be represented as a bag-of-words having the collected snippets. In some embodiments, all the snippets that were collected for a keyword are included in the bag-of-words. In other embodiments, a filtering process may be performed such that only certain collected snippets are included. For example the filtering may be based on a threshold as provided by a user. Any amount of collected snippets may be included in the bag-of-words.

Figure 6:
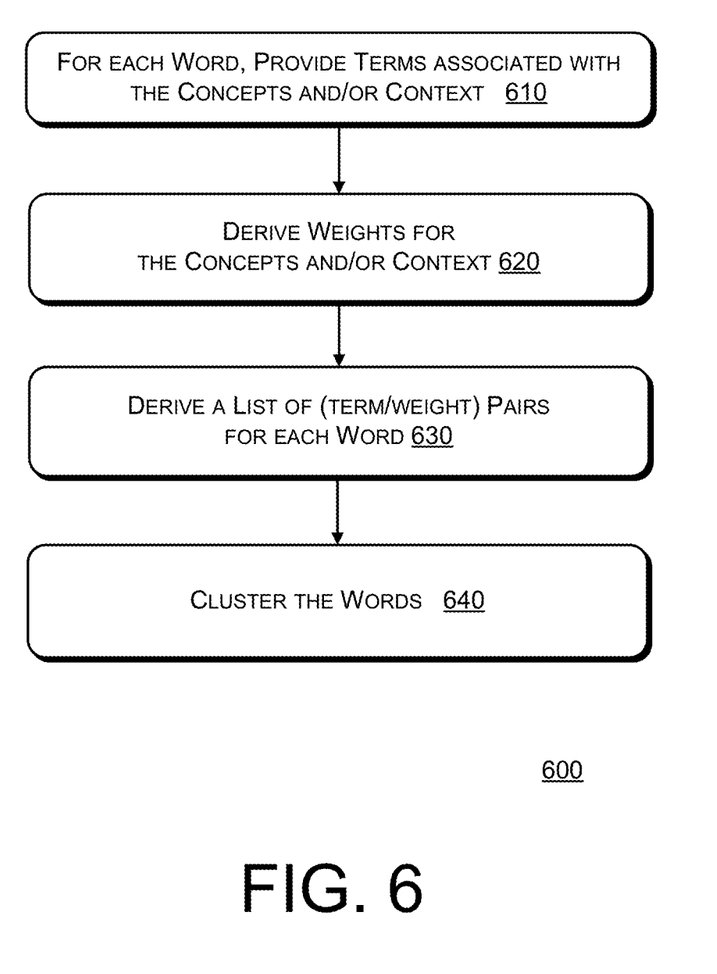
FIG. 6 illustrates an example process for clustering keywords, in accordance with various embodiments.

FIG. 6 illustrates an example process for clustering keywords, in accordance with various embodiments.

At 610, terms associated with the context and/or concepts may be provided in any manner. In some embodiments, these terms may be provided by the knowledgebase 120 and search engine 130. These terms may also be determined utilizing the concept module 234 and context module 236.

At 620, a weight may be determined for the concepts and/or context. Each keyword may include multiple terms. The terms may be ranked by their significance. Thus, weights associated with keywords may be considered when building the topology. Any method to determine the weights to reflect significance of the relationships between keywords may be used. In some embodiments, the weight may be determined based at least in part on a frequency of a term in the context derived from the search results. In some embodiments, the weight may be based at least in part on the probability of the term as a concept for the keyword as provided by the knowledgebase 120.

At 630, derive a list of term/weight pairs for each keyword. At 640, keywords are clustered based on the pairs. In various embodiments, keywords may be grouped together based on the similarity between their term/weight pairs.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
receiving a set of keywords;
determining a set of concepts corresponding to the set of keywords, wherein the determining the set of concepts comprises utilizing a general purpose knowledgebase and one or more of the set of concepts are associated with a score to indicate a probability that a term from the general purpose knowledgebase is a concept of a keyword of the set of keywords;
obtaining context information corresponding to the set of keywords by:
collecting snippets from search results obtained from a search engine;
ranking a predetermined number of snippet words based at least in part on frequency of occurrence; and
storing the predetermined number of highest ranked snippet words as the context information;
determining a weight for a term based at least in part on the set of concepts and the context information; and
performing hierarchical clustering to automatically generate a taxonomy based at least in part on the weight, the set of concepts and the context information.

2. The method of claim 1, wherein the taxonomy comprises a multi-branch hierarchy clustering.

3. The method of claim 1, wherein the performing the hierarchical clustering comprises storing nearest neighbor information.

4. The method of claim 1, wherein the obtaining the context information further comprises analyzing a set of the snippet words as a bag of words.

5. The method of claim 1, wherein the hierarchical clustering is performed using a Bayesian approach.

6. A system comprising:
one or more processors;
a memory, accessible by the one or more processors;
a keyword module stored in the memory and executable on the one or more processors to receive a set of keywords;
a concepts module stored in the memory and executable on the one or more processors to determine a set of concepts for the keywords, wherein the concepts module:
  determines the set of concepts for the keywords with a general purpose knowledgebase such that one or more of the set of concepts are associated with a score to indicate a probability that a term from the general purpose knowledgebase is a concept of the keyword;
a context module stored in the memory and executable on the one or more processors to obtain context information for the keywords, wherein the context module:
  accesses a search engine;
  collects snippets from search results obtained from the search engine;
  ranks a predetermined number of snippet words based at least in part on frequency of occurrence; and
  stores the predetermined number of highest ranked snippet words as the context information; and
a taxonomy module stored in the memory and executable on the one or more processors to determine a weight for a term based at least in part on the set of concepts and the context information and perform hierarchical clustering based at least in part on the weight, the set of concepts and the context information.

7. The system of claim 6, wherein the set of concepts is based at least in part on terms returned by the general purpose knowledgebase.

8. The system of claim 6, wherein the concepts module parses the set of keywords.

9. The system of claim 6, wherein the taxonomy module generates a multi-branch hierarchy clustering.

10. The system of claim 6, wherein context module further analyzes a set of the snippet words as a bag of words.

11. The system of claim 6, wherein the taxonomy module caches nearest neighbor information in response to performing the hierarchical clustering.

12. A computer-readable storage device storing a plurality of executable instructions configured to program a computing device to perform operations comprising:
  receiving a set of keywords;
  parsing the set of keywords to provide a keyword;
  determining a set of concepts for the keyword, wherein the set of concepts is determined with a general purpose knowledgebase such that one or more of the concepts are associated with a score to indicate a probability that a term from the general purpose knowledgebase is a concept of the keyword;
  obtaining context information for the keyword by:
    collecting snippets from search results obtained from a search engine;
    ranking a predetermined number of snippet words based at least in part on frequency of occurrence; and
    storing the predetermined number of highest ranked snippet words as the context information; and
  performing hierarchical clustering to automatically generate a taxonomy with the keyword based at least in part on the set of concepts and the context information.

13. The device of claim 12, wherein the operations further comprise caching nearest neighbor information in response to the performing of the hierarchical clustering.

14. The device of claim 12, wherein the performing hierarchical clustering includes generating a multi-branch tree.

15. The device of claim 12, wherein the operations further comprise determining a weight for the term based at least in part on the set of concepts and the context information.

16. The device of claim 12, wherein the obtaining context information for the keyword further comprises analyzing a set of the snippet words as a bag of words.

17. The device of claim 12, wherein the hierarchical clustering is a Bayesian-based hierarchical clustering.

* * * * *